US012472045B2

(12) United States Patent
Chen et al.

(10) Patent No.: US 12,472,045 B2
(45) Date of Patent: Nov. 18, 2025

(54) ELECTRIC TOOTHBRUSH AND METHOD FOR CONTROLLING THE SAME

(71) Applicant: Anhui Shuangpeng Industrial Co., Ltd., Anqing (CN)

(72) Inventors: Hailong Chen, Anqing (CN); Wangpeng Chen, Anqing (CN); Yihang Chen, Anqing (CN)

(73) Assignee: Anhui Shuangpeng Industrial Co., Ltd., Anqing (CN)

( * ) Notice: Subject to any disclaimer, the term of this patent is extended or adjusted under 35 U.S.C. 154(b) by 364 days.

(21) Appl. No.: 18/192,864

(22) Filed: Mar. 30, 2023

(65) Prior Publication Data
US 2024/0108445 A1    Apr. 4, 2024

(30) Foreign Application Priority Data
Sep. 29, 2022   (CN) .......................... 202211197213.9

(51) Int. Cl.
| | |
|---|---|
| *A61C 17/22* | (2006.01) |
| *G06F 3/16* | (2006.01) |
| *G06T 7/00* | (2017.01) |
| *H02J 50/10* | (2016.01) |
| *A61C 17/34* | (2006.01) |

(52) U.S. Cl.
CPC .......... *A61C 17/221* (2013.01); *A61C 17/222* (2013.01); *G06F 3/167* (2013.01); *G06T 7/0012* (2013.01); *H02J 50/10* (2016.02); *A61C 17/34* (2013.01); *G06T 2207/30036* (2013.01)

(58) Field of Classification Search
CPC ......... A61C 17/22; A61C 17/34; A61C 17/40; A46B 15/00
See application file for complete search history.

(56) References Cited

U.S. PATENT DOCUMENTS

| | | | |
|---|---|---|---|
| 11,350,728 B1* | 6/2022 | Shen .................... | A46B 5/0095 |
| 2019/0175322 A1* | 6/2019 | Bloch .................... | A61C 17/34 |
| 2020/0214816 A1* | 7/2020 | Bloch ................ | A61C 17/3481 |
| 2021/0227966 A1* | 7/2021 | Nanda ................ | A46B 15/0036 |

(Continued)

FOREIGN PATENT DOCUMENTS

| | | |
|---|---|---|
| CN | 208926175 U | 6/2019 |
| CN | 111682623 A | 9/2020 |
| CN | 215273513 U | 12/2021 |

*Primary Examiner* — Michael D Jennings
(74) *Attorney, Agent, or Firm* — Nitin Kaushik

(57) ABSTRACT

The present application provides an electric toothbrush and a method for controlling the same. The method includes: acquiring a current state of the electric toothbrush and a user input, the user input being acquired through an operable button on a body of the electric toothbrush; in response to the current state of the electric toothbrush being a second state and the user input meeting a first normal form, performing a first operation to bring the electric toothbrush into a first state; and in response to the current state of the electric toothbrush being the first state and meeting a first preset condition, performing the following operation: determining an operation parameter of the electric toothbrush based on feature information, wherein the feature information at least includes the user input and the operation parameter of the electric toothbrush includes a vibration frequency of the electric toothbrush.

8 Claims, 5 Drawing Sheets

(56) References Cited

U.S. PATENT DOCUMENTS

2022/0142349 A1* 5/2022 Yang .................... A61C 17/221
2023/0127030 A1* 4/2023 Li ............................ A61L 2/10
206/361

* cited by examiner

300

```
┌─────────────────────────────────────────────────────────┐
│ In response to the current state of the electric toothbrush being │ 310
│ the second state and meeting a second preset condition, control a │
│ sterilization device to sterilize the electric toothbrush │
└─────────────────────────────────────────────────────────┘
                            │
                            ▼
┌─────────────────────────────────────────────────────────┐
│ Determine sterilization intensity based on the extent of dirt │ 320
│ accumulation of the electric toothbrush and perform sterilization │
└─────────────────────────────────────────────────────────┘
```

```
┌─────────────────────────────────────────────┐
│ In response to the current state of the electric toothbrush being │ 410
│ the first state, control an audio module to play music based on │
│                    the user input                              │
└─────────────────────────────────────────────┘
                         │
                         ▼
┌─────────────────────────────────────────────┐
│ In response to the current state of the electric toothbrush being │ 420
│ the second state and meeting a third preset condition, wirelessly │
│              charge the electric toothbrush                     │
└─────────────────────────────────────────────┘
```

FIG.4

ELECTRIC TOOTHBRUSH AND METHOD FOR CONTROLLING THE SAME

CROSS-REFERENCE TO RELATED APPLICATIONS

The application claims priority to Chinese patent application No. 202211197213.9, filed on Sep. 29, 2022, the entire contents of which are incorporated herein by reference.

TECHNICAL FIELD

The present application relates to the technical field of electric toothbrushes, in particular to an electric toothbrush and a method for controlling the same.

BACKGROUND

With the increasing attention paid to oral health and the development of electric toothbrush technology, there is also an increasing demand for the functions of electric toothbrushes. It is not only hoped that electric toothbrushes can ensure the cleanliness of the oral cavity and teeth, but also hoped to provide functions such as automatic sterilization and acquisition of oral cavity images.

Therefore, an electric toothbrush and a method for controlling the same are provided to meet more needs of users.

SUMMARY

One or more embodiments of the present application provide a method for controlling an electric toothbrush, wherein the method is performed based on the following electric toothbrush and includes: acquiring a current state of the electric toothbrush and a user input, the user input being acquired through an operable button on a body of the electric toothbrush; in response to the current state of the electric toothbrush being a second state and the user input meeting a first normal form, performing a first operation to bring the electric toothbrush into a first state, wherein the first operation includes turning on the electric toothbrush so that the electric toothbrush vibrates based on a magnetic force; in response to the current state of the electric toothbrush being the first state and the user input meeting a second normal form, performing a second operation to bring the electric toothbrush into the second state, wherein the second operation includes turning off the electric toothbrush; and in response to the current state of the electric toothbrush being the first state and meeting a first preset condition, performing the following operation: determining an operation parameter of the electric toothbrush based on feature information, wherein the feature information at least includes the user input and the operation parameter of the electric toothbrush includes a vibration frequency of the electric toothbrush.

One or more embodiments of the present application provide an electric toothbrush, including a body, a brush head, a power supply module, a charging module and a control module, wherein the body is provided with a switch configured to change a current state of the electric toothbrush; the power supply module is provided at a bottom of the body and configured to supply power to the electric toothbrush; and the control module is provided inside the body, communicatively connected to a user terminal and configured to acquire the current state and a user input, control the electric toothbrush to perform different operations based on the current state and the user input, and determine an operation parameter of the electric toothbrush based on feature information.

DESCRIPTION OF THE DRAWINGS

The present application will be further described below through exemplary embodiments, which will be described in detail through the drawings. These embodiments are not restrictive, in which the same reference sign represents the same structure.

FIG. 3 illustrates a flowchart of sterilizing an electric toothbrush according to some embodiments of the present application.

FIG. 4 illustrates another exemplary flowchart of a method for controlling an electric toothbrush according to some embodiments of the present application.

DESCRIPTION OF THE EMBODIMENTS

Figure 1:
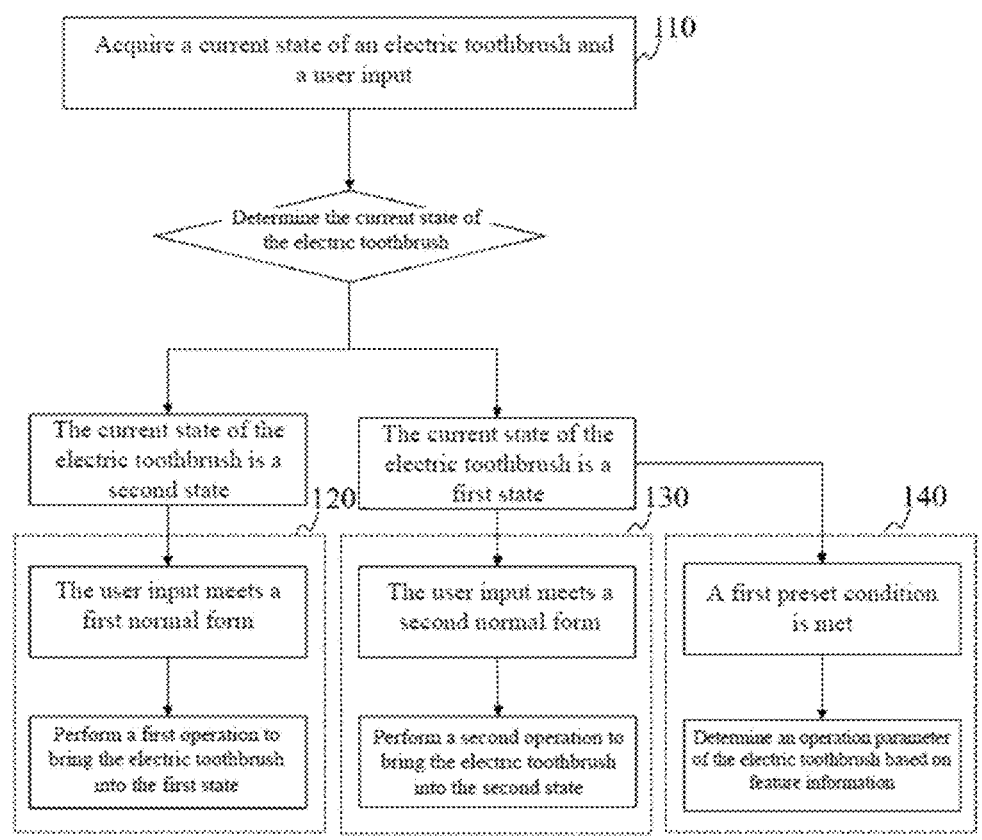
FIG. 1 illustrates an exemplary flowchart of a method for controlling an electric toothbrush according to some embodiments of the present application.

In order to more clearly describe the technical solution of the embodiments of the present application, the drawings required in the description of the embodiments will be briefly introduced below. Obviously, the drawings in the following description are only some examples or embodiments of the present application. Those skilled in the art may apply the present application to other similar scenarios based on these drawings without contributing any inventive labor. Unless it is obvious from the language environment or otherwise stated, the same reference sign in the drawings represents the same structure or operation.

It is to be understood that the terms "system", "device", "unit", and/or "module" used herein are a way for distinguishing different components, elements, parts, portions or assemblies at different levels. However, they may be replaced by other expressions in a case that such expressions can achieve the same purpose, As shown in the description and claims, unless exceptions are explicitly indicated above and below, words "one", "a" and/or "the" are not specifically referring to the singular, but may also include the plural. Generally speaking, the terms "comprise" and "include" only indicate the steps and elements that have been explicitly identified, and these steps and elements do not constitute an exclusive list. A method or device may also include other steps or elements.

Flowcharts are used in the description to describe the operations performed by the system according to the embodiments of the present application. It is to be understood that the operations are not necessarily performed accurately in order. Instead, the steps may be processed in a reverse order or simultaneously. Moreover, other operations may be added to these processes or a certain operation or several operations may be removed from these processes.

FIG. 1 illustrates an exemplary flowchart of a method for controlling an electric toothbrush according to some embodiments of the present application. In some embodiments, a process 100 may be performed based on an electric toothbrush 500. Referring to FIG. 1, the process 100 includes the following steps:

In step 110, a current state of the electric toothbrush and a user input are acquired.

The current state refers to the current working state of the electric toothbrush. In some embodiments, the current state may include a first state and a second state. The first state may be that the electric toothbrush is in an operating state. The second state may be that the electric toothbrush is in a turned-off state.

In some embodiments, the current state of the electric toothbrush may be acquired through a control module.

The user input refers to a signal instruction input by a user, such as an electric toothbrush turn-on instruction, an electric toothbrush turn-off instruction, an electric toothbrush user mode adjustment instruction, and/or an electric toothbrush operation parameter adjustment instruction.

In some embodiments, the control module may acquire the user input through an operable button on the body of the electric toothbrush. The operable button may at least include "on/off button", "user mode adjustment button", and "operation parameter adjustment button". For example, the user input may be an electric toothbrush turn-on instruction or an electric toothbrush turn-off instruction generated when the user presses the "on/off button". For another example, the user input may be an electric toothbrush user mode adjustment instruction generated when the user presses the "mode adjustment button". For another example, the user input may be an electric toothbrush operation parameter adjustment instruction generated when the user presses the "operation parameter adjustment button".

In some embodiments, the control module may acquire the user input through a user terminal. For example, the user input may be an electric toothbrush operation parameter adjustment instruction generated when the user clicks the "operation parameter adjustment button" on the user terminal.

The user terminal refers to a device or application program used by the user to input the signal instruction. For example, the user terminal may be the body 510 of the electric toothbrush. For another example, the user terminal may be a mobile phone that is communicatively connected to the control module of the electric toothbrush. For another example, the user terminal may be an application program that controls the electric toothbrush.

In some embodiments, the user mode may be set through the user terminal. The user mode may be preset according to different application scenarios. For example, the user mode may be divided according to the age of the user, including adult mode, child mode, and so on. For another example, the user mode may also be divided according to the need of the user, including gentle mode, whitening mode, and so on.

In step 120, in response to the current state of the electric toothbrush being a second state and the user input meeting a first normal form, a first operation is performed to bring the electric toothbrush into a first state.

The second state refers to the state in which the electric toothbrush is turned off.

The first normal form refers to an operation for turning on the electric toothbrush. For example, the first normal form may include that the user presses the "on/off button" on the body of the electric toothbrush for a preset amount of time. For another example, the first normal form may include that the user interacts with the user terminal interface, and inputs a turn-on instruction through an applet or other application programs in the user terminal. The turn-on instruction may be used for instructing the control module to turn on the electric toothbrush.

The first state refers to the operating state of the electric toothbrush.

In some embodiments, the first operation may include that the control module controls the electric toothbrush to be turned on, so that a motor of the electric toothbrush drives a brush head to rotate forward and backward through a rotating shaft. For example, in response to the user pressing the "on/off button" on the body of the electric toothbrush for preset time, the control module controls the electric toothbrush to be turned on, so that the motor of the electric toothbrush drives the brush head to rotate forward and backward through the rotating shaft. For another example, in response to the user interacting with the user terminal interface to input a turn-on instruction through an applet or other application programs in the user terminal, the control module controls the electric toothbrush to be turned on, so that the motor of the electric toothbrush drives the brush head to rotate forward and backward. Specifically, when the electric toothbrush is turned on, the motor of the electric toothbrush drives a brush head 520 through a rotating shaft to perform a forward and reverse rotation movement, simulating the upward and downward movement of the toothbrush during manual brushing, allowing bristles to move forward and backward along the direction of the teeth in the oral cavity of the user, thereby better cleaning the dirt on the tooth surface and between the teeth. In some embodiments, a frequency of forward and reverse rotation of the brush head may be at least one preset value determined based on simulation experiments, and the user may modify the frequency through the operable button on the electric toothbrush body or the user terminal.

Figure 2:
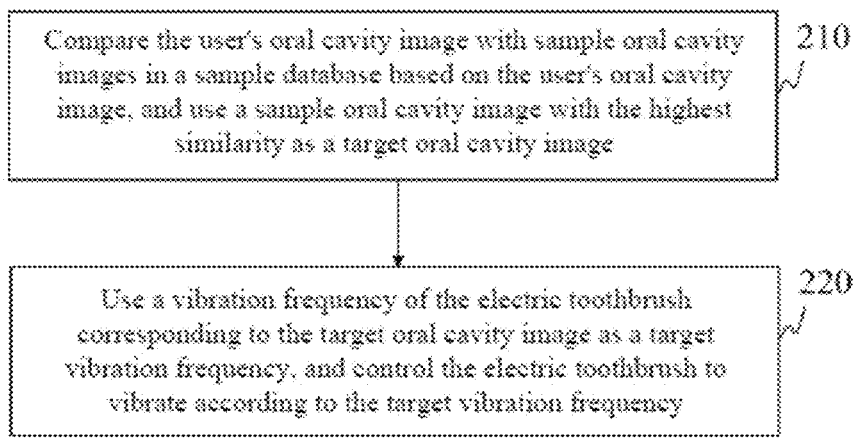
FIG. 2 illustrates an exemplary flowchart of determining an operation parameter of an electric toothbrush according to some embodiments of the present application.

In some embodiments, the brush head 520 of the electric toothbrush may also vibrate at a high frequency based on a magnetic force while moving in the forward and reverse directions. The brush head 520 may generate a large number of tiny bubbles in the mixture of toothpaste and water in the oral cavity while vibrating at a high frequency. The pressure generated when the bubbles break can get deep into the tooth space and remove dirt, thereby better ensuring the cleaning effect. Generally, the amount of bubbles generated is related to the vibration frequency of the brush head. The higher the vibration frequency is, the more bubbles will be generated. Excessive high vibration frequency may cause damage to the teeth of the user. Therefore, it is necessary to determine an appropriate vibration frequency (i.e., the operation parameter of the electric toothbrush) based on the user's own profile. For more information on determining the operation parameter of the electric toothbrush, see step 140 in FIG. 1. FIG. 2 and the relevant description in the description.

The brush head of the electric toothbrush involved in some embodiments of the present application can rotate forward and backward under the drive of the motor based on magnetic vibration. The combination of the two movement modes can better clean the tooth surface and gap, thus enabling the electric toothbrush to have better use effects.

In step 130, in response to the current state of the electric toothbrush being the first state and the user input meeting a second normal form, a second operation is performed to bring the electric toothbrush into the second state.

The second normal form refers to an operation for turning off the electric toothbrush. For example, the second normal form may include that the user presses the "on/off button" on the electric toothbrush body once. For another example, the second normal form may include that the user interacts with the user terminal interface to input a turn-off instruction through an applet or other application programs in the user terminal. The turn-off instruction may be used for instructing the control module to turn off the electric toothbrush.

In some embodiments, the second operation may include that the control module controls the electric toothbrush to be turned off, so that the electric toothbrush stops operating. For example, in response to the user pressing the "on/off button" on the body of the electric toothbrush, the control module controls the electric toothbrush to be turned off. For another example, in response to the user interacting with the user interface to input a turn-off instruction through an applet or other application programs in the user terminal, the control module controls the electric toothbrush to be turned off.

In step 140, in response to the current state of the electric toothbrush being the first state and meeting a first preset condition, the following operation is performed: determining an operation parameter of the electric toothbrush based on feature information.

In some embodiments, the first preset condition may include that the electric toothbrush receives the user input and that the user input meets a third normal form. The third normal form may include an operation for adjusting the operation parameter of the electric toothbrush. For example, the third normal form may be that the user presses the "operation parameter adjustment button" on the electric toothbrush body once. The "operation parameter adjustment button" may be used for changing the vibration frequency of the electric toothbrush.

In some embodiments, the first preset condition may be that the time from the last operation parameter adjustment of the electric toothbrush reaches a cycle T. The cycle T may be a preset value or set through the user terminal.

In some embodiments, the feature information at least includes the user input. The control module may determine the operation parameter of the electric toothbrush based on the feature information.

The operation parameter may include the vibration frequency of the electric toothbrush. For example, the operation parameter may be that the electric toothbrush vibrates at a frequency of 30000 times per minute.

In some embodiments, the control module may determine the an operation parameter of the electric toothbrush based on the user input. For example, when the user presses the "operation parameter adjustment button" on the electric toothbrush once, the vibration frequency of the electric toothbrush changes from Level 1 to Level 2, and the corresponding operation parameter of the electric toothbrush changes from the vibration frequency of 25000 times per minute to the frequency of 30000 times per minute.

In some embodiments of the present application, the operation parameter of the electric toothbrush is determined based on the feature information to achieve the control of the electric toothbrush. The operation parameter of the electric toothbrush can be adjusted according to the need of the user. For example, the operation parameter is adjusted based on the type of the user, the operation parameter is adjusted based on the current oral cavity cleanliness of the user (determined based on the users oral cavity image), and the operation parameter is adjusted based on the need of the user, so that the user can have a better use experience.

In some embodiments, the control module of the electric toothbrush may acquire a users oral cavity image through an image sensor and transmit the user's oral cavity image to the user terminal for displaying.

The image sensor refers to an image capturing device provided on the brush head 520. For example, the image sensor may be a micro camera.

The user's oral cavity image refers to an image, captured by the image sensor, of the inside of the user's oral cavity that contains the portion of the teeth.

The user terminal may include various mobile terminals, such as mobile phones, tablets, or smart bracelets. The user terminal may communicate and connect with the electric toothbrush through Bluetooth, wireless network, and other methods. It can exchange information with the control module of the electric toothbrush through an applet or other application programs, thus controlling the electric toothbrush.

In some embodiments, the users oral cavity image may be used as reference data to adjust the operation parameter of the electric toothbrush. For example, the user may know the oral cavity cleanliness based on the user's oral cavity image displayed on the user terminal, and then adjust the operation parameter of the electric toothbrush. For another example, the user's oral cavity image may be used as an input to a machine learning model to determine the operation parameter of the electric toothbrush through a trained machine learning model.

In some embodiments of the present application, the user's oral cavity image is acquired through the image sensor and transmitted to the user terminal for displaying, thus helping the user to know the information about the inside of the oral cavity in real time and do a good job in oral hygiene.

It is to be understood that the above description of the process 100 is only for exemplary and descriptive purposes, and does not limit the scope of protection of the present application. Those skilled in the art may make various modifications and changes to the process 100 under the guidance of the description. However, these modifications and changes are still within the scope of protection of the present application.

FIG. 2 illustrates an exemplary flowchart of determining an operation parameter of an electric toothbrush according to some embodiments of the present application. In some embodiments, a process 200 may be performed based on the electric toothbrush 500. Referring to FIG. 2, the process 200 includes the following steps:

In step 210, the user's oral cavity image is compared with sample oral cavity images in a sample database based on the user's oral cavity image, and a sample oral cavity image with the highest similarity is used as a target oral cavity image.

The sample database refers to a database that includes a plurality of sample oral cavity images and corresponding vibration frequencies. In some embodiments, the sample database may be obtained through preset rules based on user feedback.

The user feedback refers to the user's rating of comfort and cleanliness after using a certain operation parameter of the electric toothbrush to brush the teeth and obtaining a corresponding user's oral cavity image. For example, the user feedback may be that the comfort of the operation parameter is 5 points and the cleanliness is 6 points.

The preset rules refer to that the comfort and cleanliness fed back by the user are more than thresholds. The thresholds may be manually set based on experience. For example, the preset rules may be that the comfort is more than 6 points and cleanliness is more than 7 points.

In some embodiments, the user rating that meets the preset rules fed back by the user may be acquired firstly, and then the oral cavity image and vibration frequency corresponding to the user rating are used as data in the sample database.

In some embodiments, the vibration frequency corresponding to the user rating may be determined based on historical user data stored in the user terminal. For example, for a certain brushing process corresponding to a certain user rating, when the user turns on the electric toothbrush, the electric toothbrush vibrates based on the preset vibration frequency. The user can either not adjust the vibration frequency, or adjust the vibration frequency through the button on the body of the electric toothbrush or the mobile terminal. The control module may use the vibration frequency with the longest duration in the brushing process as the vibration frequency corresponding to the user rating.

In some embodiments, the vibration frequency may include a preset frequency of the electric toothbrush that is highly praised by the user. It may also include a user-defined frequency. For example, the frequency may be a variable frequency, a varying frequency determined by a staff background based on oral cavity images, or a frequency or frequency combination determined by a machine learning model based on oral cavity images.

The sample oral cavity images refer to user's oral cavity images that meet the preset rules in the user feedback. For example, the sample oral cavity images may be user's oral cavity images corresponding to the user rating that the comfort is 8 points and the cleanliness is 8 points in the user feedback.

The target oral cavity image refers to a sample oral cavity image in the sample database that has the highest similarity to the user's oral cavity image.

In step 220, a vibration frequency of the electric toothbrush corresponding to the target oral cavity image is used as a target vibration frequency, and the electric toothbrush is controlled to vibrate according to the target vibration frequency.

The target vibration frequency refers to a vibration frequency of the electric toothbrush corresponding to the target oral cavity image.

In some embodiments of the present application, the sample oral cavity image in the sample database that has the highest similarity to the user's oral cavity image is used as the target oral cavity image, the vibration frequency corresponding to the target oral cavity image is used as the target vibration parameter, thus helping to improve the brushing comfort of the user and achieve good oral cavity cleanliness.

In some embodiments, a model may be used to identify the extent of dirt accumulation in a current area (inside the oral cavity) based on the oral cavity image acquired from the image sensor; and the vibration frequency is determined based on the extent of dirt accumulation.

The current area refers to an internal region of the oral cavity corresponding to the oral cavity image acquired by the image sensor.

The extent of dirt accumulation refers to the amount of dirt in the oral cavity. The extent of dirt accumulation may be expressed as a real number from 0 to 1. The larger the number is, the more dirt in is accumulated in the oral cavity.

In some embodiments, the model may be a machine learning model, such as a Neural Network (NN) model.

In some embodiments, the input of the model may include the users oral cavity image. The output of the model may include the extent of dirt accumulation in the current area.

In some embodiments, the model may be obtained by training a plurality of training samples with labels. For example, the plurality of training samples with labels may be input into an initial model, a loss function is constructed based on the labels and the results of the initial model, and the parameters of the initial model are iteratively updated based on the loss function. When the loss function of the initial model meets a preset condition, the model training is completed and the trained model is obtained. The preset condition may be that the loss function converges or the number of iterations reaches a threshold.

In some embodiments, the training samples may be historical use's oral cavity images, and the labels may be the extent of dirt accumulation corresponding to the historical user's oral cavity images. The training samples may be obtained from historical user data stored in the user terminal. The labels may be obtained by manual labeling.

In some embodiments, the vibration frequency of the electric toothbrush may be determined based on the numerical value of the extent of dirt accumulation. For example, the higher the extent of dirt accumulation is, the higher the vibration frequency of the electric toothbrush is. When the extent of dirt accumulation is between 0 and 0.3, the vibration frequency of the electric toothbrush may be 25000 times per minute. When the extent of dirt accumulation is between 0.3 and 0.6, the vibration frequency of the electric toothbrush may be 30000 times per minute. When the extent of dirt accumulation is between 0.6 and 1.0, the vibration frequency of the electric toothbrush may be 35000 times per minute.

In some embodiments of the present application, the extent of dirt accumulation in the oral cavity of the user is determined through the model, and then the vibration frequency of the electric toothbrush is determined based on the extent of dirt accumulation, thus more pertinently controlling the operation parameter of the electric toothbrush, helping to improve the cleaning efficiency of the electric toothbrush and providing the user with a better use experience. For areas with a high extent of dirt accumulation, the vibration frequency may be increased accordingly, thus performing fiercer cleaning on the areas and ensuring the cleaning effect of the electric toothbrush.

In some embodiments, the vibration frequency of the electric toothbrush is also related to the amount of toothpaste used. For example, when the amount of toothpaste used is less than a threshold, the vibration frequency of the electric toothbrush may be 28000 times per minute; and when the amount of toothpaste used is more than the threshold, the vibration frequency of the electric toothbrush may be 32000 times per minute. The threshold may be manually set based on experience. The amount of toothpaste used may be determined through gravity sensing, image recognition, and other methods.

In some embodiments, the vibration frequency of the electric toothbrush is also related to the user mode. For example, when the user mode is the adult mode, the adjustable range of the vibration frequency of the electric toothbrush is 25000 times per minute to 35000 times per minute; and when the user mode is the child mode, the adjustable range of the vibration frequency of the electric toothbrush is 18000 times per minute to 30000 times per minute.

In some embodiments of the present application, different user modes correspond to different vibration frequency ranges of the electric toothbrush, and more pertinent vibration frequencies are adopted based on different user groups. The vibration frequency range in the child mode is lower than that in the adult mode, thus protecting the fragile oral cavity of the child, meeting the oral cavity cleaning need of the adult, and improving the user experience.

FIG. 3 illustrates a flowchart of sterilizing an electric toothbrush according to some embodiments of the present application. In some embodiments, a process 300 may be performed based on the electric toothbrush 500. Referring to FIG. 3, the process 300 includes the following steps:

In step 310, in response to the current state of the electric toothbrush being the second state and meeting a second preset condition, a sterilization device is controlled to sterilize the electric toothbrush.

In some embodiments, the second preset condition may include that the time from the last sterilization of the electric toothbrush is more than a first threshold. The first threshold may be manually set based on experience. For example, the second preset condition may be that the time from the last sterilization of the electric toothbrush is more than 10 days.

In some embodiments, the second preset condition may be that the time the electric toothbrush enters the second state is more than a second threshold. The second threshold may be manually set based on experience. For example, the second preset condition may be that the electric toothbrush enters the second state for more than 15 days.

In some embodiments, in response to the time from the last sterilization of the electric toothbrush being more than the first threshold or the time the electric toothbrush enters the second state being more than the second threshold, the control module controls the sterilization device to sterilize the electric toothbrush. The sterilization device may include an ultraviolet sterilization device.

In some embodiments of the present application, whether the electric toothbrush needs to sterilized is determined based on the second preset condition, thus performing sterilization in time to reduce the number of bacteria in the electric toothbrush, helping to ensure the cleanness of the electric toothbrush and enabling the user to have a better use experience.

In step 320, sterilization intensity is determined based on the extent of dirt accumulation of the electric toothbrush and sterilization is performed.

In some embodiments, the control module may sterilize the electric toothbrush according to a preset parameter. The preset parameter may be set based on experience.

In some embodiments, the control module may determine the sterilization intensity based on the extent of dirt accumulation of the electric toothbrush. The extent of dirt accumulation may be determined based on the last sterilization time of the electric toothbrush and the total working time of the electric toothbrush after the last sterilization.

In some embodiments, the extent of dirt accumulation of the electric toothbrush is related to the sum of the extent of dirt accumulation in the oral cavity during times of tooth brushing after the last sterilization.

In some embodiments, the extent of dirt accumulation of the electric toothbrush may be determined through a machine learning model. For details, see FIG. 2 and the relevant description.

The sterilization intensity refers to the level of the amount of the fungicide required for sterilization. For example, the sterilization intensity may be Level 2.

In some embodiments, when the extent of dirt accumulation of the electric toothbrush is between 0 and 0.3, the sterilization intensity may be Level 1; when the extent of dirt accumulation of the electric toothbrush is between 0.3 and 0.6, the sterilization intensity may be Level 2; and when the extent of dirt accumulation of the electric toothbrush is between 0.6 and 1.0, the sterilization intensity may be Level 3.

In some embodiments of the present application, the sterilization intensity is determined according to the extent of dirt accumulation, thus realizing more pertinent sterilization and effectively reducing the number of bacteria on the electric toothbrush.

FIG. 4 illustrates another exemplary flowchart of a method for controlling an electric toothbrush according to some embodiments of the present application. In some embodiments, a process 400 may be performed based on the electric toothbrush 500. Referring to FIG. 4, the process 400 includes the following steps:

In step 410, in response to the current state of the electric toothbrush being the first state, an audio module is controlled to play music based on the user input.

The audio module may be a module for storing and playing audio. The audio may be audio configured by the factory of the toothbrush, or it may be audio downloaded by the user through the user terminal. The user terminal may be a mobile APP or the like. The audio includes but is not limited to music, and may also be English learning audio or the like.

The audio module maybe controlled in various ways. In some embodiments, when the current state of the electric toothbrush is the first state, the user may press the button on the electric toothbrush to control the audio module to play music according to preset control rules. For example, "press once" to play music. "press twice" to play the next music, "press three times" to play the previous music, "press long" to stop playing music, etc. The control rules may be set through the user terminal.

In some embodiments, when the current state of the electric toothbrush is the first state, the user may also control the audio module to play music through the user terminal. For example, the user may turn on the audio module of the electric toothbrush by using the mobile phone APP, and click the control button corresponding to the audio module of the electric toothbrush in the APP to perform corresponding operations such as playing, playing previous/next, or stopping music.

In step 420, in response to the current state of the electric toothbrush being the second state and meeting a third preset condition, the electric toothbrush is wirelessly charged.

The third preset condition may include that the body of the electric toothbrush is placed on a charging module and the charging module is connected to a power supply and/or internally stores electricity.

In some embodiments, the user may connect the charging module to the power supply for a long time. In this case, the charging module may be considered as a fixed device. After each use of the toothbrush, when the current state of the electric toothbrush is in the second state, the body of the electric toothbrush is placed on the charging module to perform wireless charging, thus avoiding forgetting to charge and causing the toothbrush to be out of power the next time it is used. For more content about the body of the electric toothbrush, the charging module and wireless charging, see FIG. 5 and the relevant description.

In some embodiments of the present application, the audio module is controlled to play music, thus allowing the user to have a richer experience while brushing the teeth to ensure brushing time, and helping to better protect oral health; wireless charging is adopted, thus making it more convenient to charge the electric toothbrush.

Figure 5:
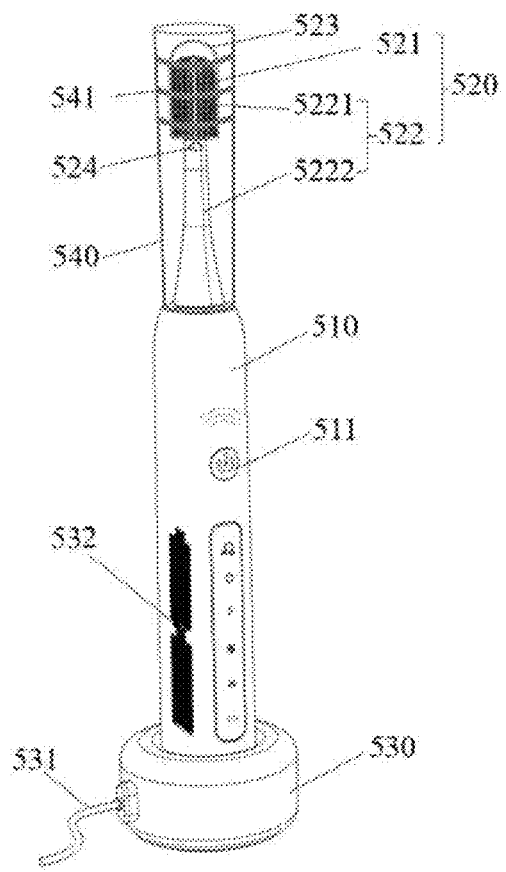
FIG. 5 illustrates a schematic structural diagram of an electric toothbrush according to some embodiments of the present application.

FIG. 5 illustrates a schematic structural diagram of an electric toothbrush according to some embodiments of the present application. Referring to FIG. 5, the electric toothbrush 500 includes at least a body 510, a brush head 520, a power supply module (not shown), a charging module 530, and a control module (not shown).

The body 510 may refer to a main structural part of the electric toothbrush 500. In some embodiments, the body 510 is provided with a switch 511 (in some embodiments, the switch 511 may also be referred to as an "on/off" button) for changing the current state of the electric toothbrush 500. For example, pressing the on/off button for 2 seconds can turn on the electric toothbrush 500, and pressing the on/off button can turn off the electric toothbrush 500.

In some embodiments, an upper end of the body 510 is connected to a lower end of the brush head 520. For more content about the brush head, see the following description.

In some embodiments, a bottom of the body 510 is provided with the power supply module. Placing the body 510 on top of the charging module 530 connected to a power supply allows wireless charging of the power supply module. For more content about the power supply module and the charging module 530, see the following description.

In some embodiments, the body 510 is internally provided with the control module configured to determine the operation parameter of the toothbrush. For more content about the control modules and the operation parameter, see the following description.

In some embodiments, an audio module is further provided inside the body 510. For more content about the audio module, see FIG. 4 and the relevant description.

In some embodiments, other structures may also be provided on the body 510. For example, a touch screen may be provided on the body for user input. Specifically, the user may switch the vibration frequency level through the touch screen, and select to play audio through the touch screen. For another example, a display module may also be provided on the body to display operation information of the electric toothbrush 500. The operation information may be relevant information about the current operating state of the electric toothbrush 500, such as the level information of the vibration frequency, power quantity information, and the like.

The brush head 520 may refer to a component that extends into the user's mouth for cleaning. In some embodiments, the brush head 520 may include bristles 521 and a brush head handle 522. The brush head handle 522 may include an upper brush head handle 5221 and a lower brush head handle 5222. The bristles 521 are fixedly mounted on the upper brush head handle 5221 for cleaning the user's oral cavity. A rotating shaft (not shown) is provided inside the lower brush head handle 5222 and connected to one end of a motor (not shown). A lower end of a housing of the lower brush head handle 5222 is connected to an upper end of the body 510. The rotating shaft may be used for driving the bristles on the upper brush head handle to rotate.

In some embodiments, a lower end of the upper brush head handle 5221 is detachably connected to an upper end of the lower brush head handle 5222 to facilitate regular replacement of bristles. Detachable connection may include, but is not limited to, threaded connection, snap connection, etc.

In some embodiments, one side of a top of the upper brush head handle 5221 is connected with a half protective shell 523 in a clamping manner, which can protect the gums during tooth brushing.

In some embodiments, the brush head 510 is provided with an image sensor 524. The image sensor 524 may be communicatively connected to the user terminal to acquire a user's oral cavity image, and transmit the user's oral cavity image to the user terminal through the control module. The communicative connection includes, but is not limited to, Bluetooth, WIFI, etc.

The image sensor 524 refers to a sensing device that can be used for acquiring the oral cavity image, such as a CMOS image sensor or a CCD image sensor.

In some embodiments, the image sensor 524 may be provided on an upper side of the lower brush head handle 5222 of the brush head 510 and subjected to waterproof treatment to ensure that the image sensor can work normally for a long time, and there is no need to replace the image sensor when replacing the bristles 521, thus reducing the cost of the electric toothbrush. Various methods may be used for waterproof treatment. For example, the image sensor 524 is provided inside a transparent housing, and the connection between the housing of the lower brush head handle 5222 and the housing of the image sensor 524 is sealed. For another example, the lower brush head handle 5222 may adopt an integrated structure, and the housing only needs to keep the corresponding mounting position of the image sensor 524 in a transparent color.

In some embodiments, the image sensor 524 is electrically connected to the power supply module to ensure that the image sensor can operate for a long time.

In some embodiments, the image sensor 524 may also be electrically connected to the control module. After receiving the query information from the user terminal, the control module transmits the user's oral cavity image to the user terminal for displaying. For the specific content about that the image sensor acquires the user's oral cavity image and the control module transmits the user's oral cavity image to the user terminal, see FIG. 1 and the relevant description.

In some embodiments, the electric toothbrush 500 further includes a separable outer jacket 540 provided on an outer side of the brush head 520 and movably mounted with the body 510 of the electric toothbrush 500. When the user needs to use the electric toothbrush 500, the user only needs to remove the separable outer jacket. The movable mounting may include, but not limited to, threaded connection, or other connection methods such as snap connection.

In some embodiments, the separable outer jacket 540 may include an ultraviolet sterilization device 541 for sterilizing the brush head 521 of the electric toothbrush 500.

The ultraviolet sterilization device 541 may refer to a device that uses ultraviolet light to sterilize. In some embodiments, the ultraviolet sterilization device may include an ultraviolet lamp (not shown). The ultraviolet lamp may have various structural forms. For example, it may be ring-shaped or tubular.

The ultraviolet sterilization device 524 can be arranged in various ways, including but not limited to being arranged on the upper side of the inner wall of the separate outer jacket. In some embodiments, the ultraviolet sterilization device 524 may be provided circumferentially along an inner wall of the separable outer jacket 540 to fully contact the bristles 521 on the brush head 520 with ultraviolet light to improve the sterilization effect.

In some embodiments, the separable outer jacket 540 and the body 510 may be provided with an electrical connection structure (not shown) to supply power to the ultraviolet sterilization device 541. After the user finishes the use of the electric toothbrush 500, the separable outer jacket 540 may be placed an outer side of the brush head 520 of the toothbrush and connected to the body 510 of the toothbrush through the electrical connection structure. The ultraviolet sterilization device 541 is energized to sterilize the brush head 520. The electrical connection structure may refer to a structure for connection for energization, including but not limited to structures such as connectors/interfaces.

For the specific content about that the sterilization device sterilizes the electric toothbrush 500, see FIG. 3 and the relevant description.

The power supply module 532 may be a module for supplying power to the electric toothbrush 500. In some embodiments, the power supply module 532 is a lithium-ion battery module provided at the bottom of the body 510 of the electric toothbrush 500 and is electrically connected to the control module to ensure that the control module can control the electric toothbrush 500 to perform relevant operations of the user. The lithium-ion battery module includes a lithium-ion battery cell and a first magnetic induction component.

In some embodiments, the power supply module is provided with a waterproof structure (not shown) and a first magnetic induction component (not shown). The waterproof structure can be used for ensuring the normal operation of the power supply module and the modules inside the body. The waterproof structure may be of various types, including but not limited to scaling with plastic rings to achieve a waterproof function.

The first magnetic sensing component may refer to one of components used for wireless charging, such as a magnetic induction coil.

In some embodiments, the control module can configure a reminder function for the power supply module. For example, when the power quantity is less than a preset threshold, early warning information may be given out to remind the user to charge. The preset threshold may be a power quantity value (e.g., 5%) that has been preset by the manufacturer when the electric toothbrush 500 leaves the factory, or may be a power quantity value set by the user through the user terminal. The early warning information may be one or a combination of more of prompt tone (e.g., sharp ticking sound), prompt color (e.g., red), and the like.

The charging module 530 may refer to a module for charging the electric toothbrush 500. The charging module may be either a fixed charging module or a mobile charging module. For example, the charging module 530 may be charged to store power firstly by connecting a power supply connection cable 531 to the power supply, and then the charging module 530 charges the power supply module (similar to a charging bank).

In some embodiments, the charging module 530 may include a second magnetic induction component (not shown) that performs induction with the first magnetic induction component to wirelessly charge the power supply module. For example, when the electric toothbrush 500 needs to be charged, the lower end of the body 510 of the electric toothbrush 500 may be placed on the charging module, and the second magnetic induction component in the charging module 530 is sucked in with the first magnetic induction component in the power supply module to achieve wireless charging through electromagnetic induction, electromagnetic resonance, and other methods. The second magnetic induction component may also be one of components for wireless charging. The second magnetic induction component is provided corresponding to the first magnetic induction component.

The control module may refer to a module that controls the electric toothbrush 500 to perform different operations. In some embodiments, the control module is placed inside the body 510, is communicatively connected to the user terminal and is used for acquiring the current state and user input.

In some embodiments, the control module may control the electric toothbrush 500 to perform different operations based on the current state and user input. For example, if the current state of the electric toothbrush 500 is the first state and the user input meets a second normal form, the control module controls the electric toothbrush 500 to perform a turn-off operation. For another example, if the current state of the electric toothbrush 500 is the second state and the user input meets a first normal form, the control module controls the electric toothbrush 500 to be turned on.

Further, the control module may also determine an operation parameter of the electric toothbrush 500 based on feature information. For the specific content about determining the operation parameter of the electric toothbrush 500 based on feature information, see FIG. 1 and the relevant description.

In some embodiments, a motor (not shown) is provided inside the body 510 and is used for controlling the brush head 520 to vibrate. In some embodiments, the motor may control the brush head to vibrate and/or rotate at a high frequency to deeply clean the user's mouth. For example, when the bristles 5221 on the brush head 520 vibrate at a high frequency, the mixture of toothpaste and water in the oral cavity produces a large number of tiny bubbles. When the bubbles burst, the pressure generated can penetrate into gaps between teeth to clean dirt, while the friction generated by the rotation of the bristles 5221 can clean the tartar on the tooth surface, thus achieving a deep cleaning effect.

In some embodiments, when the motor is in use, both forward and backward rotation directions can be selected through user input to pertinently remove tartar. For example, when the user brushes his or her teeth, the motor drives the bristles 5221 on the brush head 520 to rotate in a forward direction, so that the bristles 5221 brush down the tartar on the surface of the upper teeth and in the upper alveolus, and vice versa, to brush up the tartar on the surface of the lower teeth and in the lower alveolus.

In some embodiments, the control module may include a processor (not shown) for determining the operation parameter of the electric toothbrush 500 based on the user's oral cavity image acquired by the image sensor 524. The operation parameter may include a vibration frequency of the brush head. For the specific content about determining the operation parameter of the electric toothbrush 500 based on the user's oral cavity image, see FIG. 2 and the relevant description.

The basic concept has been described above. Obviously, for those skilled in the art, the above detailed disclosure is only an example and does not constitute a limitation to the present application. Although it is not explicitly stated herein, those skilled in the art may make various modifications, improvements, and revisions to the present application. However, such modifications, improvements and revisions are recommended in the present application, and thus still fall within the spirit and scope of the exemplary embodiments of the present application.

At the same time, the present application uses specific words to describe the embodiments of the present application. For example, "one embodiment", "an embodiment", and/or "some embodiments" refer to a feature, structure, or characteristic related to at least one embodiment of the present application. Therefore, it is to be emphasized and understood that "an embodiment" or "one embodiment" or "one alternative embodiment" mentioned twice or more at different positions in the present application does not necessarily refer to the same embodiment. In addition, certain features, structures, or characteristics in one or more embodiments of the present application may be appropriately combined.

In addition, unless explicitly stated in the claims, the order of processing elements and sequences, the use of numbers and letters, or the use of other names in the present application is not intended to define the order of the processes and methods in the present application. Although some embodiments currently considered useful have been discussed through various examples in the above disclosure, it is to be understood that such details are for descriptive purposes only, and the additional claims are not limited to the disclosed embodiments. On the contrary, the claims are intended to cover all modifications and equivalent combinations that comply with the essence and scope of the embodiments of the present application. For example, although the system components described above may be implemented through hardware devices, they may also be implemented only through software solutions. For example, the described system is mounted on an existing server or mobile device.

Similarly, it is to be understood that in order to simplify the expression disclosed in the present application and thereby assist in the understanding of one or more embodiments of the present application, the previous description of the embodiments of the present application sometimes incorporates multiple features into one embodiment, drawing, or description thereof. However, this disclosure method does not mean that the object of the description requires more features than those mentioned in the claims. In fact, the features of the embodiments are less than all the features of individual embodiments disclosed above.

Numbers that describe the number of components and attributes are used in some embodiments. It is to be understood that such numbers used for the description of the embodiments are modified by the modifiers "about", "approximately", or "substantially" in some examples. Unless otherwise stated, "about", "approximately", or "substantially" indicates that a variation of ±20% is allowed in the number. Correspondingly, in some embodiments, the numerical parameters used in the description and claims are approximate values that can be changed depending on the characteristics required by individual embodiments. In some embodiments, the numerical parameters should take into account the specified significant digits and adopt a general digit retention method. Although the numerical ranges and parameters used for confirming the range breadth in some embodiments of the present application are approximate values, such values in specific embodiments are set as accurately as possible within the feasible range.

For each patent, patent application, patent application publication, and other materials referenced in the present application, such as articles, books, instructions, publications and documents, the entire content is incorporated herein for reference, except for application history documents that are inconsistent with or conflict with the content of the description, as well as documents that limit the widest range of claims the present application (currently or hereafter appended to the description). It is to be understood that if there is any inconsistency or conflict between the descriptions, definitions, and/or terms used in the attached materials of the description and the content of the description, the descriptions, definitions and/or terms used in the description shall prevail.

Finally, it is to be understood that the embodiments described in the description are only used for describing the principles of the embodiments of the present application. Other variations may still fall within the scope of the present application. Therefore, as an example, rather than a limitation, alternative configurations of the embodiments of the present application may be considered consistent with the teachings of the present application. Accordingly, the embodiments of the present application are not limited to those explicitly introduced and described in the description.

What is claimed is:

1. A method for controlling an electric toothbrush, wherein the method is performed based on a control module comprising a processor and comprises:

acquiring a current state of the electric toothbrush and a user input, the user input being acquired through an operable button on a body of the electric toothbrush;

in response to the current state of the electric toothbrush being a second state and the user input meeting a first normal form, performing a first operation to bring the electric toothbrush into a first state, wherein the first operation comprises turning on the electric toothbrush so that a motor of the electric toothbrush drives a brush head to rotate forward and backward through a rotating shaft and the brush head vibrates based on a magnetic force;

in response to the current state of the electric toothbrush being the first state and the user input meeting a second normal form, performing a second operation to bring the electric toothbrush into the second state, wherein the second operation comprises turning off the electric toothbrush; and in response to the current state of the electric toothbrush being the first state and meeting a first preset condition, performing the following operation:

determining an operation parameter of the electric toothbrush based on feature information, wherein the feature information at least comprises the user input and the operation parameter of the electric toothbrush comprises a vibration frequency of the electric toothbrush; and acquiring a user's oral cavity image through an image sensor and transmitting the user's oral cavity image to a user terminal for displaying.

2. The method for controlling the electric toothbrush according to claim 1, wherein the feature information further comprises a user's oral cavity image acquired by an image sensor and determining the operation parameter of the electric toothbrush based on feature information includes:

comparing the user's oral cavity image with sample oral cavity images in a sample database based on the user's oral cavity image, and using a sample oral cavity image with the highest similarity as a target oral cavity image, the sample database being obtained through preset rules based on user feedback; and using a vibration frequency of the electric toothbrush corresponding to the target oral cavity image as a target vibration frequency, and controlling the electric toothbrush to vibrate according to the target vibration frequency.

3. The method for controlling the electric toothbrush according to claim 1, wherein the method further comprises:

in response to the current state of the electric toothbrush being the second state and meeting a second preset condition, controlling a sterilization device to sterilize the electric toothbrush.

4. The method for controlling the electric toothbrush according to claim 1, wherein the method further comprises:

in response to the current state of the electric toothbrush being the first state, controlling an audio module to play music based on the user input; and in response to the current state of the electric toothbrush being the second state and meeting a third preset condition, wirelessly charging the electric toothbrush.

5. An electric toothbrush, comprising a body, a brush head, a lithium-ion battery module, a charging module and a control module, wherein the body is provided with a switch configured to change a current state of the electric toothbrush;

the lithium-ion battery module is provided at a bottom of the body and configured to supply power to the electric toothbrush, and the lithium-ion battery module comprises a lithium-ion battery cell and a first magnetic induction component; and the control module is provided inside the body, communicatively connected to a user terminal and configured to acquire the current state and a user input, control the electric toothbrush to perform different operations based on the current state and the user input, and determine an operation parameter of the electric toothbrush based on feature information;

wherein the brush head is provided with an image sensor, and the image sensor is communicatively connected to the user terminal and configured to acquire a user's oral cavity image and transmit the user's oral cavity image to the user terminal through the control module.

6. The electric toothbrush according to claim 5, wherein a motor is provided inside the body and configured to control the brush head to vibrate, the control module comprises a processor configured to determine the operation parameter of the electric toothbrush based on a user's oral cavity image acquired by an image sensor, and the operation parameter comprises a vibration frequency of the brush head.

7. The electric toothbrush according to claim 5, wherein the electric toothbrush further comprises a separable outer jacket and the separable outer jacket is movably mounted to the electric toothbrush; and the separable outer jacket comprises an ultraviolet sterilization device configured to sterilize the electric toothbrush.

8. The electric toothbrush according to claim 5, wherein an audio module is provided in the body and configured to play music; and the lithium-ion battery module is provided with a waterproof structure and the first magnetic induction component, the charging module comprises a second magnetic induction component, and the second magnetic induction component performs induction with the first magnetic induction component to wirelessly charge the lithium-ion battery module.

* * * * *